April 10, 1951 H. E. HEBERDING 2,548,787
AIRCRAFT CONTROL SYSTEM
Filed Nov. 15, 1946
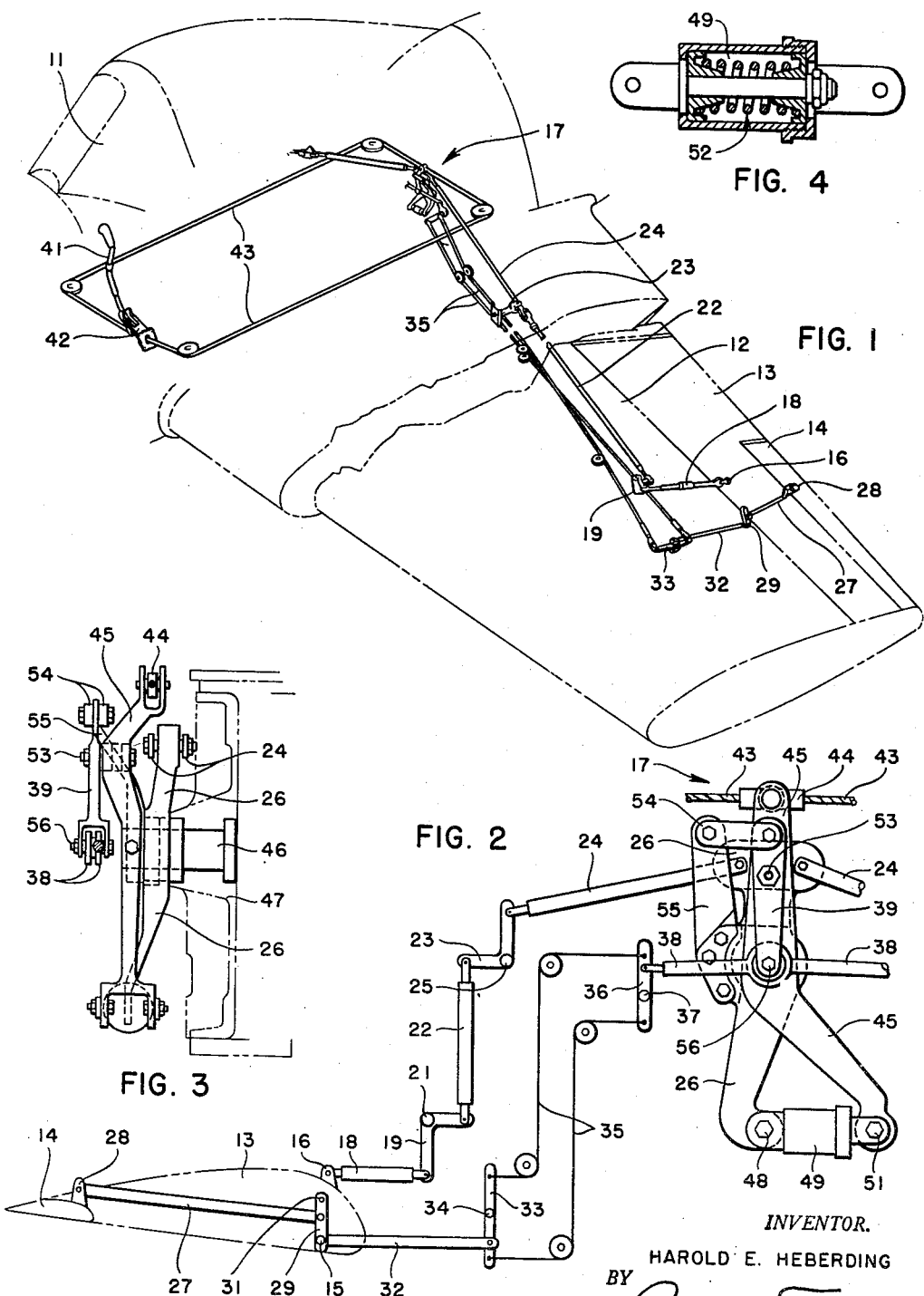
INVENTOR.
HAROLD E. HEBERDING
BY
Richard W. Treverton
ATTORNEY Patented Apr. 10, 1951

2,548,787

UNITED STATES PATENT OFFICE 2,548,787

AIRCRAFT CONTROL SYSTEM

Harold E. Heberding, Columbus, Ohio, assignor to Curtiss-Wright Corporation, a corporation of Delaware Application November 15, 1946, Serial No. 710,006

5 Claims. (Cl. 244—82)

The present invention relates to aircraft controls and more particularly to controls of the spring tab type.

In a system of this kind, as applied to aileron control for example, a tab is hinged to each aileron of the airplane, and the ailerons and tabs are differentially connected to the stick or other pilot operable control, with spring means being provided to resist movement of the tabs relative to the ailerons. The arrangement is such that each aileron may be moved as a unit with its tab, or, differentially, the tab may be moved relative to the aileron in a direction such that aerodynamic forces acting on the tab will assist control movement of the aileron. In this manner the control forces required of the pilot may be reduced greatly.

In such systems it is usual practice to provide spring connections between the ailerons and their tabs in the form of spring cartridge units, one of which is mounted on or adjacent each aileron. This has not only involved duplication of parts but has permitted an undesirable simultaneous displacement of both ailerons in the same direction under certain conditions, both ailerons floating upwardly against the spring resistance of the cartridge units.

The present invention obviates such duplication of spring cartridge units and at the same time provides a positive connection between the two ailerons (or other pair of connected control elements) thereby insuring that one will not operate without the intended correlated operation of the other. According to the invention a single differential unit is connected to the two ailerons and, by separate connections, to the two tabs. The arrangement is such that under some conditions only the aileron connections are required to move. As a result friction losses in the control system are reduced.

The foregoing and other objects and advantages of the present invention will become apparent from the following description of the typical embodiment of the invention shown in the accompanying drawings, wherein:

Figure 1 is a perspective view illustrating the application of the system to an airplane of which certain major components are shown in broken lines;

Figure 2 is a front elevation of the differential unit with other parts of the system shown in a schematic arrangement;

Figure 3 is a side elevational view of the differential unit; and

Figure 4 is a detail sectional view of the spring cartridge unit.

As shown in Figure 1 the aircraft may comprise a fuselage with cabin 11, and a wing 12. To the trailing edge of the wing on each side of the fuselage is a control surface comprising an aileron 13 provided at its trailing edge with an auxiliary control surface comprising a hinged tab 14. Only the left wing of the aircraft is illustrated, but it will be understood that the aileron and tab construction and operating connections to be described hereinafter are of similar but reversed arrangement to those illustrated for the left wing.

The aileron is moved about its hinge axis 15 (see Figure 2) by means of a linkage connected to its horn 16 and extending to the differential unit which is indicated generally at 17 and is preferably installed near the axis of symmetry of the airplane. The linkage may comprise a link 18 connecting the aileron horn to a bell crank 19 that is pivoted at 21 to the wing, and a link 22 connecting the bell crank 19 to a pivoted arm 23. It further comprises a link 24 connecting the arm 23, which may be pivoted to the wing at 25, to the aileron control member 26 of the differential unit 17. The arrangement of the linkage, shown diagrammatically in Figure 2 as being disposed in a single plane, actually extends in several different planes as will be understood from Figure 1.

The same is true of the linkage connecting the tab 14 to the differential unit. This comprises a link 27 connecting a tab horn 28 to a lever 29 that is pivoted at 31 to the aileron 13 and is connected by another link 32 to a second lever 33. The latter is pivoted at 34 to the wing and is connected by suitable flexible cables 35 to a third lever 36 which is pivoted to the aircraft at 37. Lever 36 is in turn connected by a link 38 to a tab control lever 39 of the differential unit 17. As appears in Figure 2, the axis of the pivot connection between lever 29 and link 32 coincides with the aileron hinge axis 15 in the neutral position of the tab 14. Hence the aileron 13 may be moved by the linkage extending between horn 16 and member 26 without necessarily moving the tab-operating linkage.

A pilot operable control stick 41 is mounted in the cabin upon a bracket 42 for movement fore and aft to effect control of the aircraft about the pitching axis (through means not shown) and for lateral movement for control about the axis of roll. For the latter purpose the stick is connected by a run-around cable 43 to a fitting 44 that is pivoted to a lever 45 of the differential unit 17.

Turning now to a description of the differential unit, as shown in Figures 2 and 3, the pilot operable or control lever 45 is fixed to a spindle 46 which is journalled in a support 47 affixed to the aircraft fuselage or wing center section. The aileron control member 26 is rotatably mounted on the spindle 46 and at its lower end is pivotally connected at 48 to a spring cartridge unit 49 which is pivoted at 51 to the lower end of pilot control lever 45. The cartridge unit may be resiliently extended or contracted, to increase or decrease the distance between pivots 48 and 51, by reason of spring means 52 arranged in the unit as shown in Figure 4.

The tab lever 39 is pivoted by pin 53 to the lever 45 and is connected by pivoted links 54 to an arm 55 which is rigid with the aileron lever 26. As shown in the drawings when the elements of the differential unit are in neutral position the pivot pin 56, which connects links 38 to lever 39, is axially aligned with spindle 46.

In operation, lateral movement of stick will result in similar movement of control lever 45. In case of very light loads on the ailerons the spring cartridge unit will not be flexed appreciably, so that the aileron control lever 26 will move as a unit with lever 45. Since pin 56 is substantially aligned axially with spindle 46, and the pivot between parts 29 and 32 is disposed substantially along the aileron hinge axis, no appreciable movement of the tabs 14 relative to their respective ailerons will occur in this situation. The linkage including links 32 and 38, levers 33 and 36 and cables 35, remains substantially stationary thus imposing no frictional or other resistance to control movement of the ailerons.

In the presence of appreciable loads on the ailerons, the spring cartridge unit will yield, causing the tab to be moved into a position in which aerodynamic forces upon it will move, or aid movement of, the ailerons in the direction desired. For example with reference to Figure 2, if the control lever 45 is moved clockwise about its pivot axis, to raise the trailing edge of aileron 13, but if such action is prevented by yielding of the cartridge unit 49 due to aerodynamic loads on the aileron, the following action will occur Pivot 53 moved to the right relative to members 26 and 54 will cause lever 39 to be swung counterclockwise relative to lever 45. Through the resulting movement of link 38, lever 36, cables 35, lever 33, link 32, lever 29 and link 27, the tab 14 will be moved relative to the aileron 13 to cause its trailing edge to be lowered. Aerodynamic forces on the down-turned tab will urged upward movement of the aileron trailing edge.

It will be understood that the linkage described provides a positive connection between the two ailerons, and also a positive connection between the two tabs; that the tab linkage does not always move with the aileron linkage, thereby avoiding friction losses in the system; and that a single centrally located differential unit, including a spring cartridge, provides the desired differential movement of both tabs relative to their respective ailerons. It will be understood further that while described specifically in connection with ailerons the system may be used in connection with other interconnected control surfaces and their tabs or like auxiliary surfaces.

It will be understood also that the form and arrangement of the component parts of the system are merely illustrative of the inventive principles involved, and that the latter may be otherwise embodied without departing from the spirit of the invention or from the scope of the appended claims:

1. In a control system for an aircraft, a pair of hinged ailerons each having a tab hinged to the trailing edge thereof, a lever hinged to each aileron for operating the tab, an operating linkage for the tabs connected to the levers at points substantially aligned with the aileron hinge axes when the tabs are in neutral position, a pilot operable member and an aileron control lever hinged on a common axis to the aircraft, spring means connecting said member and aileron control lever for spring resisted relative movement about said common axis, an operating linkage for the ailerons connected to said aileron control lever, and a tab control lever hinged to said member and pivotally connected to said tab operating linkage on an axis that is substantially coincident with said common axis when said tabs are in neutral position.

2. In an aircraft control system, a pair of hinged ailerons each having a tab hinged to the trailing edge thereof, a member hinged to each aileron for operating the tab, a tab operating linkage having an articulated connection with said tab operating members at points substantially aligned with the aileron hinge axes when the tabs are in neutral position relative to the ailerons whereby aileron movement will not effect substantial movement of the tabs from such neutral position, a pilot operable lever and an aileron control lever hinged on a common axis to the aircraft, a tab control lever pivotally carried by one of the aforementioned levers and having an articulated connection with the other one thereof, spring means connecting two of said levers for resisting relative movement of them, a mechanical aileron operating system connecting said ailerons with said aileron control lever for operation by the latter, and said tab operating linkage having an articulated operating connection with said tab control lever substantially coincident with said common axis when the tabs are in neutral position whereby upon movement of said levers as a unit about said common axis there will be no substantial movement of said tab operating linkage.

3. In an aircraft control system, a pair of hinged ailerons each having a tab hinged to the trailing edge thereof, a mechanical tab operating system connecting said tabs articulated at points substantially aligned with the aileron hinge axes when the tabs are in neutral position relative to the ailerons whereby aileron movement will not effect substantial movement of the tabs from such neutral position, a pilot operable lever and an aileron control lever hinged on a common axis to the aircraft, a tab control lever pivotally carried by one of the aforementioned levers and having an articulated connection with the other one thereof, spring means connecting two of said levers for resisting relative movement of them, a mechanical aileron operating system connecting said ailerons with said aileron control lever for operation by the latter, and said tab operating system having an articulated operating connection with said tab control lever substantially coincident with said common axis when the tabs are in neutral position whereby upon movement of said levers as a unit about said common axis there will be no substantial movement of said tab operating system.

4. In an aircraft control system, a hinged airfoil having a tab hinged to the trailing edge thereof, a member hinged to the airfoil for operating the tab, a tab operating linkage having an articulated connection with said tab operating member at a point substantially aligned with the airfoil hinge axis when the tab is in neutral position relative to the airfoil whereby airfoil movement will not effect substantial movement of the tab from such neutral position, a pilot operable lever and an airfoil control lever hinged on a common axis to the aircraft, a tab control lever pivotally carried by one of the aforementioned levers and having an articulated connection with the other one thereof, spring means connecting two of said levers for resisting relative movement of them, a mechanical airfoil operating system connecting said airfoil with and for operation by said airfoil control lever, and said tab operating linkage having an articulated operating connection with said tab control lever substantially coincident with said common axis when the tab is in neutral position whereby upon movement of said levers as a unit about said common axis there will be no substantial movement of said tab operating linkage.

5. In an aircraft control system, a hinged airfoil having a tab hinged to the trailing edge thereof, a mechanical tab operating system articulated at a point substantially aligned with the airfoil hinge axis when the tab is in neutral position relative to the airfoil whereby airfoil movement will not effect substantial movement of the tab from such neutral position, a pilot operable lever and an airfoil control lever hinged on a common axis to the aircraft, a tab control lever pivotally carried by one of the aforementioned levers and having an articulated connection with the other one thereof, spring means connecting two of said levers for resisting relative movement of them, a mechanical airfoil operating system connecting said airfoil with and for operation by said airfoil control lever, and said tab operating linkage having an operating connection with said tab control lever substantially coincident with said common axis when the tab is in neutral position whereby upon movement of said levers as a unit about said common axis there will be no substantial movement of said tab operating system.

HAROLD E. HEBERDING.

REFERENCES CITED

The following references are of record in the file of this patent:

UNITED STATES PATENTS

| Number | Name | Date |
|---|---|---|
| 2,337,706 | Berry | Dec. 28, 1943 |
| 2,370,844 | Davis | Mar. 6, 1945 |
| 2,395,671 | Kleinhans et al. | Feb. 26, 1946 |
| 2,431,529 | Wendt | Nov. 25, 1947 |

FOREIGN PATENTS

| Number | Country | Date |
|---|---|---|
| 489,392 | Great Britain | July 26, 1938 |
| 542,944 | Great Britain | Feb. 3, 1942 |